United States Patent [19]

Jung

[11] 3,811,949
[45] May 21, 1974

[54] HYDRAZINE FUEL CELL AND METHOD OF OPERATING SAME

[75] Inventor: Margarete Jung, Kelkheim/Taunus, Germany

[73] Assignee: Varta A.G., Frankfurt/Main, Germany

[22] Filed: July 1, 1970

[21] Appl. No.: 51,544

[30] Foreign Application Priority Data
July 3, 1969  Germany............................ 1933778

[52] U.S. Cl........ 136/86 D, 136/86 E, 136/120 T C
[51] Int. Cl. .......................................... H01m 27/04
[58] Field of Search ....... 75/169; 136/120 FC, 86 D

[56] References Cited
UNITED STATES PATENTS

| | | | |
|---|---|---|---|
| 3,184,417 | 5/1965 | Hort.................................. | 252/474 |
| 3,318,736 | 5/1967 | Barber................................. | 136/86 |
| 1,612,782 | 12/1926 | Vogt et al. ............................ | 75/169 |
| 2,786,754 | 3/1957 | Klochkov............................. | 75/169 |
| 2,853,382 | 9/1958 | Klochkov............................. | 75/169 |
| 3,130,044 | 4/1964 | Flindt.................................... | 75/169 |
| 3,154,413 | 10/1964 | Dow..................................... | 75/169 |
| 3,429,751 | 2/1969 | Heuse ........................... | 136/120 FC |

FOREIGN PATENTS OR APPLICATIONS
1,067,669   5/1967   Great Britain

*Primary Examiner*—A. B. Curtis
*Assistant Examiner*—H. A. Feeley
*Attorney, Agent, or Firm*—Weiser & Stapler

[57] ABSTRACT

An amalgamated metal, like nickel, iron or cobalt to use hydrazine electrochemically, or mixtures and alloys, an electrode, a fuel cell and battery, and methods of using same.

6 Claims, 8 Drawing Figures

HYDRAZINE FUEL CELL AND METHOD OF OPERATING SAME

Hydrazine is typical of unstable compounds which can also be used in fuel cells for specialized applications. These fuels provide a rich source of hydrogen for direct electrochemical conversion. The use of these fuels, including the alkali metal boranates and boron hydrides is, however, very limited because they are so unstable and self-decompose. Hydrazine will decompose in an alkaline electrolyte to ammonia, nitrogen and hydrogen if contacted with catalysed electrodes. Note, W. Vielstich, *Fuel Cells*, Chemie GmbH, Weinheim, 1965, pp. 105 et seq. The fuel is decomposed without being utilized to electrical energy. This is also noteworthy during rest periods. The ammonia which is dissolved in the alkaline electrolyte adversely affects the operation of the oxygen electrode. It has also been noted that the oxygen electrode becomes highly polarized, this interfering further with the efficiency of operation of the fuel cell.

It has been also attempted to control and limit the feeding of the hydrazine or like fuel to the fuel electrode to the amount which the electrode can consume, this of course involving a very delicate operation since it is difficult to exactly predict the precise rate of conversion of an electrode during the operation of the battery. This method also considerably limits the rate of oxidant feed to the oxygen electrode.

It is evident from a study of the prior art that no satisfactorily efficient method or devices are readily available to use highly reducing fuels like hydrazines or boronhydrides.

This invention provides a fuel cell which is capable of operating practically without decomposition of hydrazine and without simultaneous utilization of the nascent hydrogen; hence the fuel is utilized completely. The invention also provides an electrode, the fuel cells and batteries which do not decompose hydrazine during the rest period of the cell, when no electrical current is taken off. The invention in another embodiment provides for stabilized hydrazine system.

The electrodes, the fuel cell and the battery of the invention comprise an amalgam of a suitable skeleton or supporting metal like nickel, iron or cobalt, or alloys of these metals, preferably in the form of a powder, or sintered particles.

In accordance with the invention, it is now possible to use in the fuel cell - instead of the hitherto known electrodes consisting of catalytic material - ordinary nickel, iron, or cobalt, or their respective alloys, in powder form. These metals are less expensive that the known catalysts and moreover, they are easier to handle in the manufacture of the electrodes. Iron and nickel have proved to be especially useful for use in alkaline electrolyte. In a favored embodiment of the fuel cell of the invention, the hydrazine electrode is made of a porous, amalgamated nickel-sintered body, which is preferably made of carbonylnickel.

In accordance with the invention, it is also possible now to minimize polarization of the oxygen electrode which is due to decomposition of the fuel by providing the oxygen electrode with a coating of a mercury layer, when there is a possibility that the electrode may be exposed to hydrazine contact. The decomposition of the hydrazine in the electrolyte at the oxygen electrode is thereby hindered.

For the oxygen electrodes of the fuel cell of the invention, the known catalysts for oxygen electrodes are suited. The use of silver is especially recommended, also in the form of silver-coated nickel or silver-coated carbon. Raney-silver has proved to be very useful.

It has been found in accordance with the invention that the suppression of the hydrazine decomposition at the electrodes depends on the quantity of mercury used in the amalgamation of the electrode. The hydrazine electrodes contain at least 0.3 to about 25 percent by weight of mercury based on the total weight of the electrode body.

Within the range of approximately 1 to 10 percent by weight of mercury, optimum operation of the electrode can be achieved with respect to its electrical load capacity. At 0.5 percent by weight, only a very small decomposition of the fuel occurs; with larger amounts of mercury, up to 25 percent by weight, the decomposition is suppressed.

Because of the effective suppression of hydrazine decomposition in the cell, according to the invention, only a certain minimum concentration of fuel needs to be maintained in the electrolyte. However, in contrast to the prior art, it is quite practical to work with higher concentrations of hydrazine. The regulation of the fuel feed is simplified and the quantity of electrolyte to be circulated is reduced. Furthermore, there is avoided the concentration polarization at the hydrazine electrode caused by the lack of fuel. The load of the battery is thereby increased. The fuel cell of the invention may contain in the alkaline electrolyte 0.5 to about 16, preferably 3 to 10 percent by weight of hydrazine based on the total weight of the electrolyte.

The porous materials made of the named metals which are especially suited as electrodes for hydrazine conversion can be coated with mercury simply and effectively. The metals to be coated are immersed into a strongly alkaline, approximately 5 percent boronate solution (e.g. sodium or potassium boronate). The electrodes are charged with hydrogen by being immersed until a strong generation of gaseous hydrogen occurs. Thereafter the reduced metal is contacted with a solution that contains a mercury salt, preferably a water-soluble salt like $HgCl_2$. Mercury separates on the entire surface of the porous body replacing hydrogen. The amalgamation may be promoted by the application of a vacuum. The mercury adheres firmly to the surfaces of the electrodes. The layer is also stable against other mechanical action, such as vibration and against air and oxygen.

The charging of the metal matrix with hydrogen can be promoted by various procedures. In one embodiment hydrogen is introduced into the metal by means of a treatment with strongly reducing, hydrogen-yielding agents. Well suited for this purpose are aqueous solutions of complex hydrides, such as hydrazine or alkali boranate solutions. Another embodiment is to treat the matrix material, i.e., the Raney alloys, especially, alloys of the metals nickel, iron, cobalt, separately, or alloyed to each other, with acides, bases, water or other hydroxy-containing compounds to dissolve out the inactive metal component, as Al, Zn, Mg, Si, Ca, and Li. Preferably there is present in the solution a complex-forming chemical which will keep the dissolved component in solution. By this method, large amounts of hydrogen are built into the remaining metal.

For the preparation of the amalgam of the Raney metal any salt of mercury is suitable, preferably a watersoluble mercuric (II) or mercurous (I) salt. Typical salts include mercurous nitrate, mercuric acetate, mercuric bromide, mercuric chloride, mercurous chlorate and mercuric chlorate, mercuric sulfate, and the like.

With some of these salts, a portion of the dissolved hydrogen is consumed by the reduction of the ions to ammonia, such as occurs with mercuric or mercurous nitrate. It is therefore advisable to use mercury salts or complexes which are free of reducible anions. Mercuric chloride $HgCl_2$ is ideally suited for this purpose.

The invention will be described herein with reference to the accompanying drawings in which.

The following examples are not intended to be limitations on the scope of the invention. All percentages are by weight.

EXAMPLE 1

An electrode shaped as a plate was rolled and sintered of carbonyl-nickel to a thickness of 0.3 mm, a porosity of 60 percent and a median pore diameter of approximately 30 microns. The plate was first kept overnight in a 5 percent boranate solution in 1 N sodium hydroxide to be charged with hydrogen, and thereafter was immersed directly into an 0.2 percent aqueous solution of mercury (II)-nitrate under application of moderate vacuum.

There is obtained a layer of nickel amalgam on the surface and in the pores of the electrode. The amount of mercury separated increased the weight of the electrode by 6.6 percent.

Figure 1:
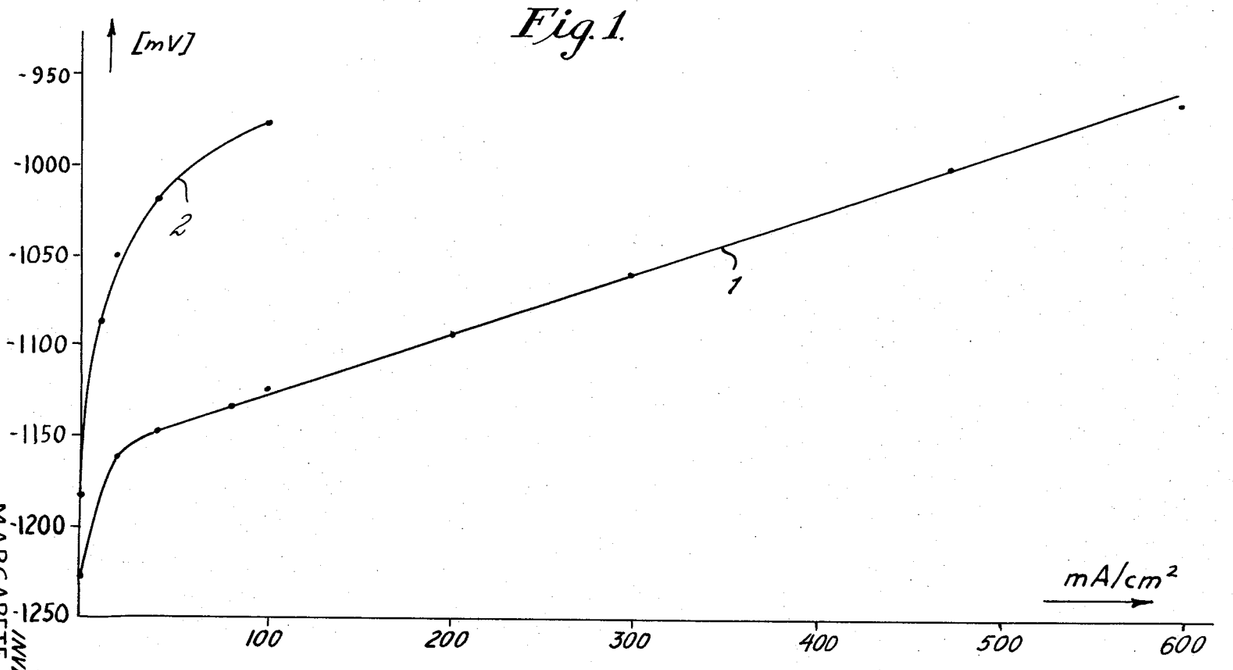
FIG. 1 shows a comparison between the performance of an amalgamated and a non-amalgamated fuel electrode under increasing electrical charge.

In a half-cell, comparative experiments were made between the amalgamated electrode and a non-amalgamated but in other respects identical electrodes. The results are shown in FIG. 1.

Curve 1 shows that the capability the amalgamated electrode to be charged at a temperature of 24°C was significantly higher than that of the control electrode shown in curve 2. See also the rest potentials. The concentration of hydrazine was 2 moles per liter (approximately 6.4 percent by weight) of 5.95 N potassium hydroxide. At a potential of −1000 mV (measured against a saturated calomel-electrode), the amalgamated electrode could be charged with 475 mA/cm² as compared to 57 mA/cm² for the control nickel electrode. With a load of 100 mA/cm² the control electrode breaks down. At other potentials, likewise, the electrode of the invention could be charged to higher loads than the control electrode.

EXAMPLE 2

Another electrode was manufactured to be used as the oxidant electrode for a hydrazine cell of a fine-porous cover layer of carbonyl-nickel (to face the electrolyte), and a catalytically active working layer, made of silver-plated carbonyl-nickel with an approximately tenfold greater median pore diameter (to face the oxygen source).

The electrode was charged with hydrogen in a sodium boranate solution; it was then inserted into an aqueous 0.2 percent solution of mercury (II)-chloride with a small addition of hydrochloric acid, and thereafter the air pressure was reduced in order to fill the pores with the solution. A 4.8 percent by increase in weight due to the precipitated mercury was noted. The capability of the electrode of the invention to be electrically charged was observed to be as follows:

At low charges up to approximately 25 mA/cm², a control electrode and that of the invention appear to behave similarly. At higher loads the polarization of an amalgamated $O_2$-electrode is considerably smaller, which is evidenced by the horizontal line of the current/voltage curve.

The hydrazine decomposition rate due to the amalgamated oxygen electrodes is essentially lower, approximating one-fifth. The hydrazine decomposition then increases when the electrodes are at a potential of approximately 500 mV above the reversible hydrogen potential. It is, however, even then considerably lower than with the control oxygen electrodes. It is noteworthy that amalgamated electrodes - in contrast to the non-amalgamated electrodes - practically do not age in the uncharged state.

EXAMPLE 3

A fuel cell according to the invention was equipped with an amalgamated fuel electrode, according to Example 1, and an amalgamated oxygen electrode, according to Example 2. 6 N KOH with 6 percent by weight hydrazine served as electrolyte. The oxygen electrode was operated with gaseous oxygen under a pressure of 1.0 atmosphere gauge. At a load of 100 mA/cm² the fuel cell showed a total voltage of 0.85 volt at 22°C. Ammonia could not be detected neither in the vented nitrogen not in the electrolyte. Instead of oxygen, any other conventional oxidant can be used, like hydrogen peroxide.

EXAMPLE 4

The self-decomposition of a solution of 0.62 percent by weight of hydrazine in 6 N KOH at 60°C was determined with a palladium treated porous nickel electrode, previously used for the electrochemical conversion of hydrazine. The electrode contained 1 mg palladium per cm² of electrode surface. No electrical load was applied to the electrode.

Figures 2, 4:
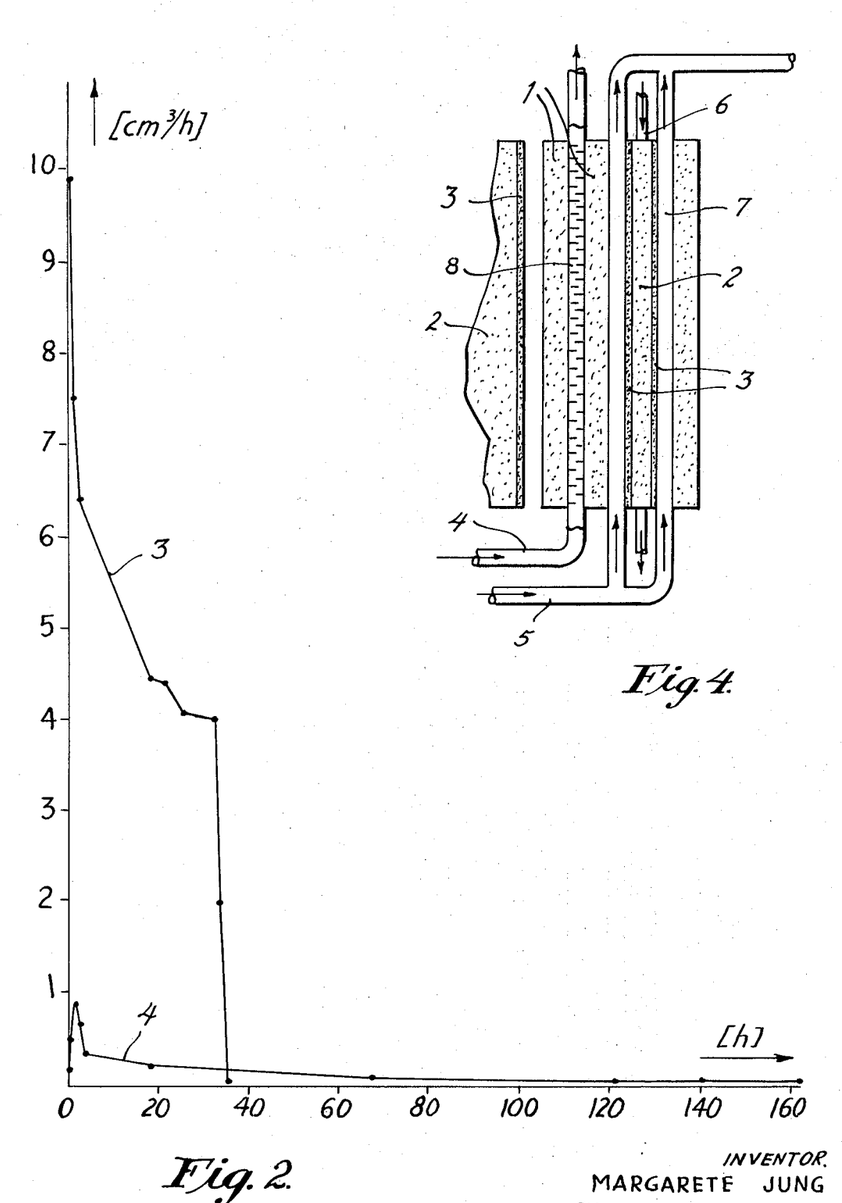
FIG. 2 shows the effect of an amalgamated electrode, according to the invention on hydrazine in comparison with a corresponding, but palladium coated electrode.
FIG. 4 reproduces schematically a section from a battery, constructed according to the invention.

Curve 3 in FIG. 2 shows the high decomposition rate of the hydrazine with the electrode. The decomposition rate was initially 10 cm³ of gaseous mixture per hour per cm² electrode surface and ceased only when the hydrazine in the solution was practically used up. The NH$_3$-content in the gaseous mixture was 0.6 percent by volume.

Curve 4 shows the decomposition rate with an amalgamated electrode, according to Example 1, under otherwise the same conditions. No evolution of ammonia was detected. It is noteworthy that gaseous evolution with the electrode of the invention did not exceed 1 cm$^3$ per hour per cm$^2$ of electrode surface because of the repressed and controlled decomposition of the hydrazine under the described experimental conditions.

EXAMPLE 5

In further experiments, the rate and amount of hydrazine decomposed by the electrode of the invention during rest periods was determined. An electrode amalgamated, according to Example 1 (9 per cent by weight Hg and a diameter of 40 mm), was immersed in solutions of hydrazine at different concentrations (0.62, 1.09, 1.49, 2.85, and 6.6 percent by weight) in 6 N KOH, at 60°C for 120 hours. No electrical load was applied. Measurement of the potential, and of the volume of gas evolved by the decomposition of the hydrazine at the electrode were regularly determined.

It was observed that the rate at which the electrodes reached their rest potential (with small and limited evolution of nitrogen) was related to the concentration of hydrazine in the electrolyte; the higher the concentration, the higher the rate. When the rest potential was reached, no further decomposition of the fuel took place, in excess of control solutions of stored, metal-free hydrogen could be observed.

Figure 3:
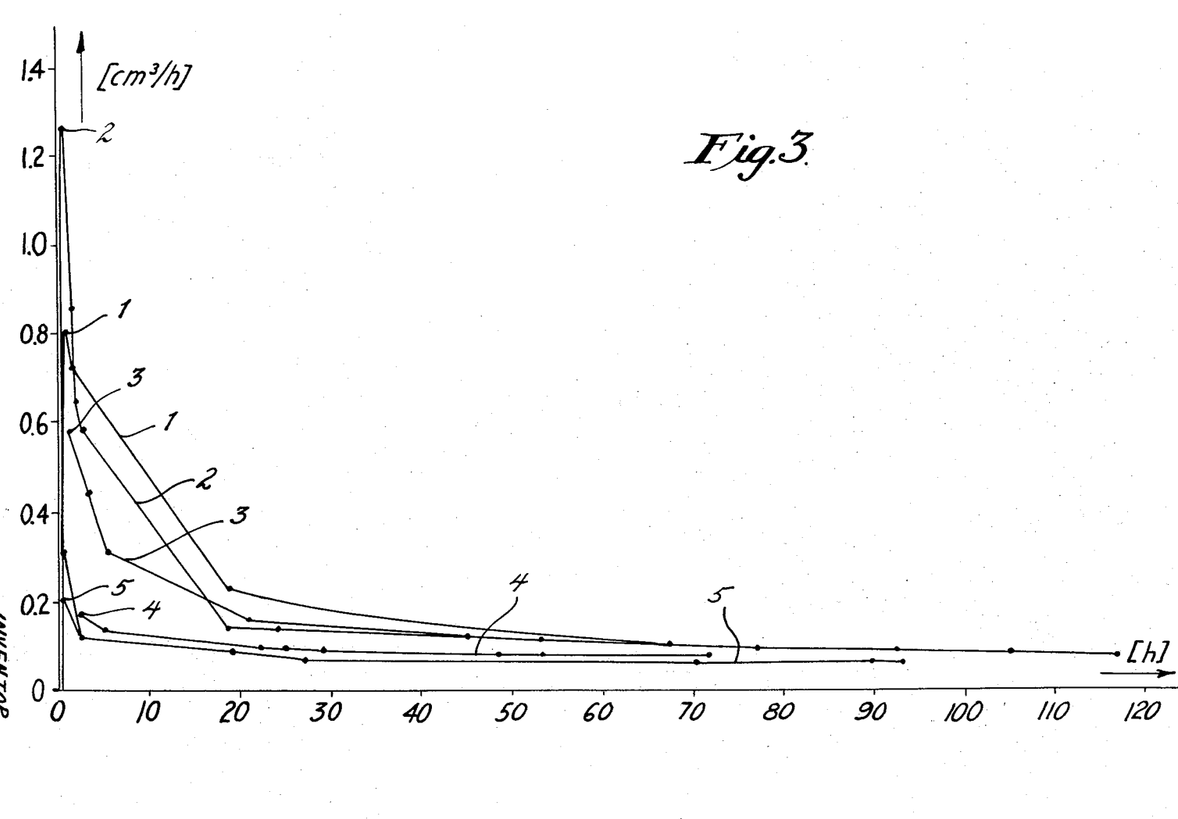
FIG. 3 shows various decomposition rates of hydrazine and time to reach rest period for an electrode of the invention.

FIG. 3 shows the various decomposition rates and time lapsed to attain the rest potential for concentrations of 0.62% which is shown by curve 1
1.49% which is shown by curve 2
1.09% which is shown by curve 3
6.60% which is shown by curve 4
2.85% which is shown by curve 5

It is noteworthy that in hydrazine cells equipped according to the invention, no aging could be ascertained even after 4,300 hours of continuous operation with a current density of 50 mA/cm$^2$, at 60°C. The relationship between the mercury content, the rest potential and the potential at 100 mA/cm$^2$ at various mercury contents is shown in the table below.

| Hg Content in % by weight | Rest Potential mV vs. sat. calomel | Potential at 100 mA/cm$^2$ |
|---|---|---|
| 15 | −1178 | −1114 |
| 10 | −1258 | −1160 |
| 5 | −1304 | −1260 |
| 2.5 | −1238 | −1156 |
| 1 | −1215 | −1113 |
| 0.5 | −1198 | −1081 |
| 0.25 | −1180 | −1050 |
| 0 | −1170 | −1000 |

FIG. 4 shows schematically one type of possible construction of a cell and a battery of the invention. Electrode 1 has two single layers positioned at a narrow distance from one to each other. Optional separator 8 provides reinforcement of both plates and simultaneous multiple deflection of the hydrazine-containing solution which flows through, as shown by the arrows. Minimum resistance to the nitrogen gas is caused thereby. The oxygen electrode has a coarsely porous, catalytically active layer 2 with the two fine-porous amalgamated cover layers 3; the oxygen-containing fuel is supplied via conduit 6. Hydrazine-containing electrolyte is supplied to electrode 1 via pipe 4. Pipe 5 supplies pure electrolyte that flows along both faces of the fine-porous cover layers 3 of the oxygen electrodes. The distance between electrode 1 and the cover layers 3 is made as small as possible.

Instead of the two separated electrolyte cycles, starting at 4 and 5, with and without hydrazine, a single cycle can be provided with a hydrazine-containing electrolyte, or, hydrazine can be added to both cycles. In that case it is advisable that cover layers 3 be amalgamated layers, or that they be covered by means of a suitable diaphragm 7 to minimize the contact with the hydrazine solution, which would be decomposed and cause loss of fuel.

When a single electrolyte cycle is desired, it is adequate to provide a hydrazine electrode of one catalytically active layer around which the electrolyte flows, as is shown at the right side of FIG. 4.

The fuel cell is so operated that the cycle of hydrazine solution in electrolyte (line 4) is maintained separate from that of the pure electrolyte (line 5). Under optimum conditions the total voltage was 0.61 volt. The electrodes have preferably large surface areas. In both cycles 4 and 5, as shown the total voltage in the above described battery could be raised to 0.61 volt.

A battery of the invention was operated with one electrode having two catalytically operative faces and two oxygen electrodes having a single catalytically active face.

Another battery having two catalytically operative faces was operated in accordance with the invention. During the operation the hydrazine concentration in the electrolyte (7 N NaOH) flowing between the hydrazine electrodes was steadily kept to 2 moles of hydrazine per liter of electrolyte.

Figure 5:
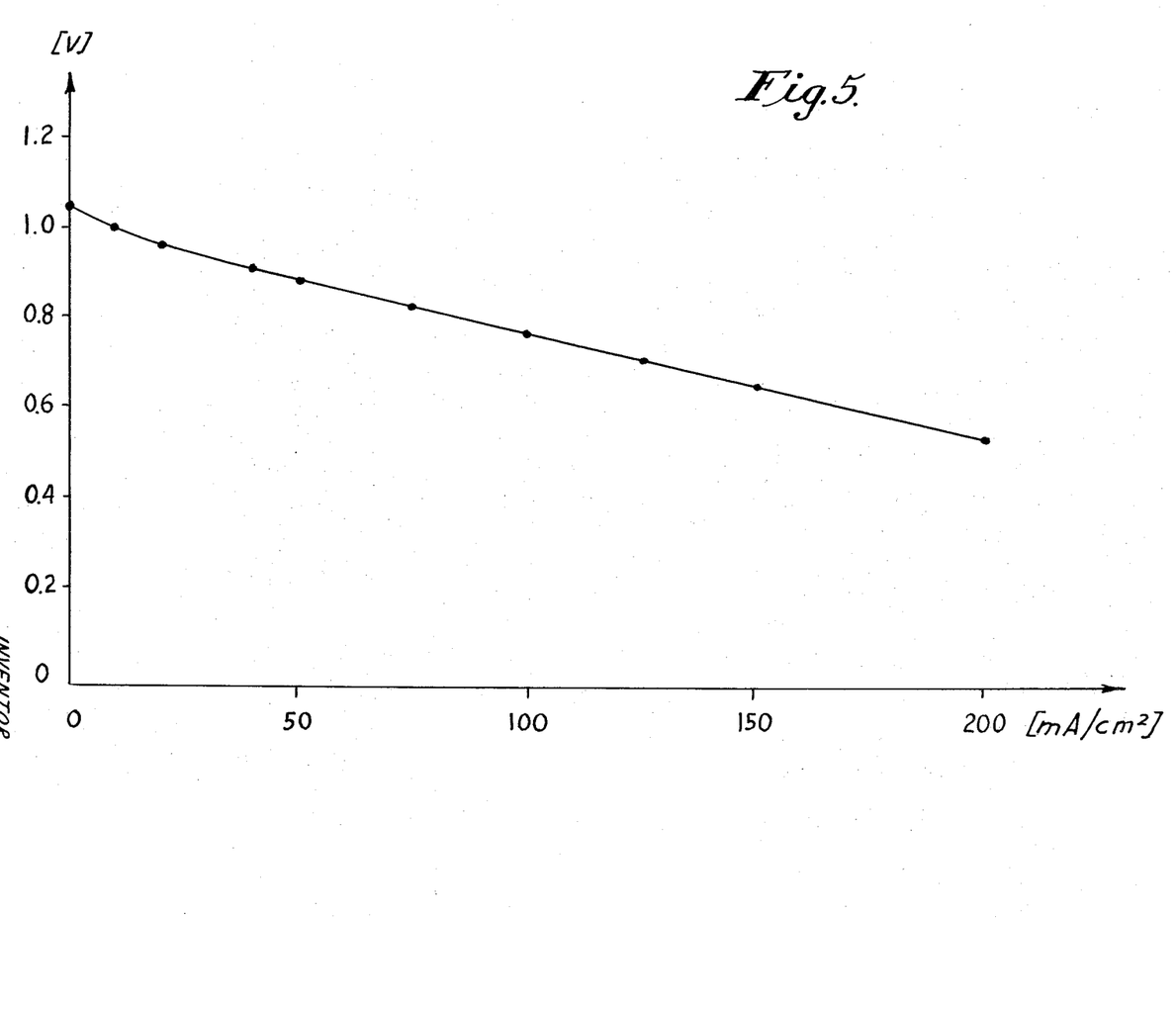
FIG. 5 shows the current/voltage values of a hydrazine cell.

The current/voltage curve of the battery is reproduced in FIG. 5. The oxygen pressure was 1.28 atmosphere gauge. At 60°C, the electrical output was 200 mA per cm$^2$ of electrode surface. The total current was 58 A, the total voltage 0.55 volt. The dimensions of the battery were 25 × 90 × 125 mm.

The batteries of the invention can be operated with continuous or under discontinuous addition of hydrazine. For example, by voltage control (manually or automatically) it can be provided that when a minimum hydrazine concentration is reached, additional hydrazine is fed to the electrolyte. Some fluctuations of voltage are to be expected under such conditions.

EXAMPLE 6

An electrode material of mercury-coated carbon powder and the additional metals described below is prepared following the general procedure of Example 1. The carbon amalgam powder is poured into a metal holder with a perforated screen front having a working surface of 10 cm$^2$ and a metal back plate.

The electrodes were of the following composition:

| Electrode | Materials | Curves |
|---|---|---|
| 1 | Carbon (Activated) | 1 |
| 2 | Carbon + 0.1% Pd | 2 |
| 3 | Carbon + 1% Hg | 3 |
| 4 | Carbon + 0.1% Pd + 1% Hg | 4 |

The electrodes are operated at 60°C, in a half-cell in alkaline electrolyte (6 N KOH), feeding 2 moles of $N_2H_4$.

Figure 6:
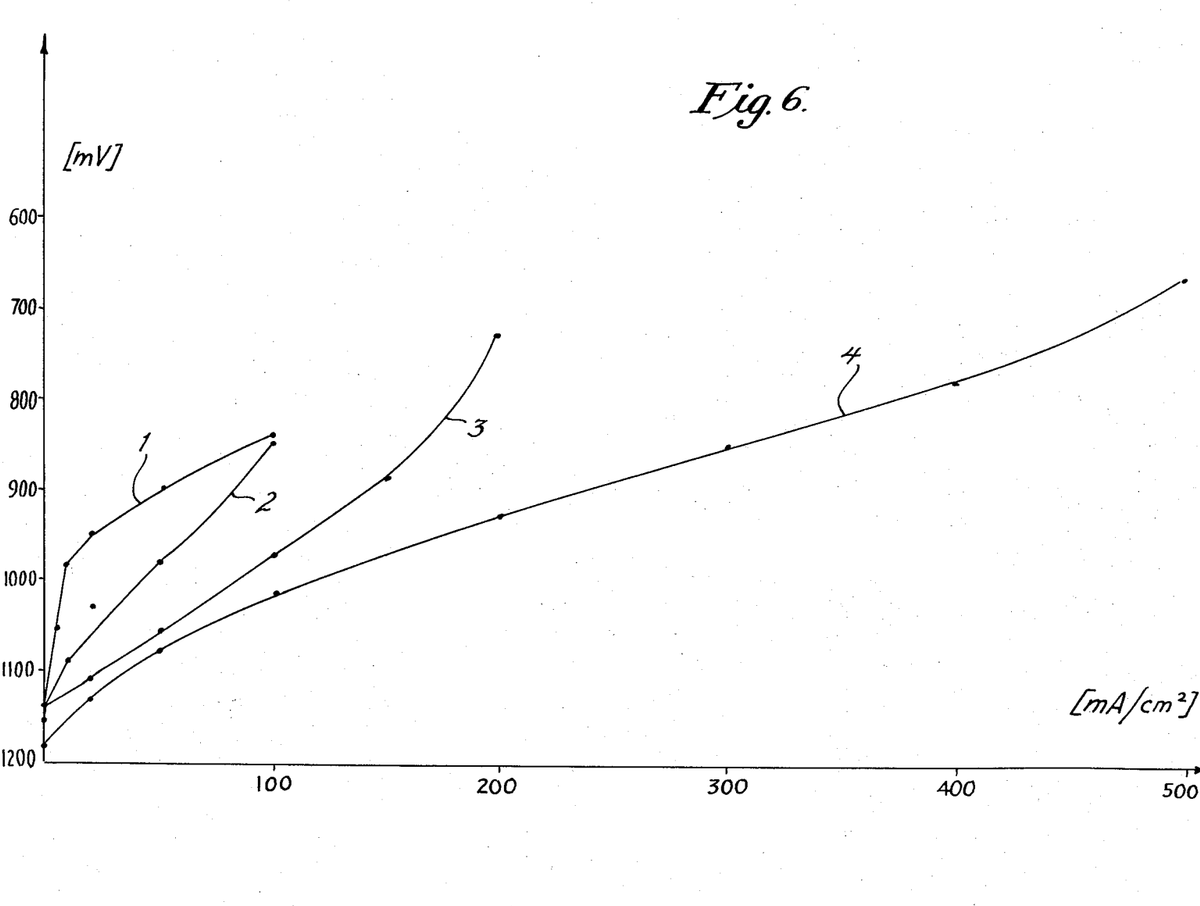
FIG. 6 shows the performance of a carbon electrode of the invention.

The markedly improved performance of the electrodes of the invention is illustrated by curves 3 and 4 of FIG. 6.

EXAMPLE 7

The cell of Example 6 is operated with a concentration of hydrazine of about 16 percent with like improved performance. The hydrazine is directly converted to electrical energy. No evolution of hydrogen could be observed; no ammonia liberation was detected in the electrolyte.

In a series of experiments, the electrode material under heavy load effectively consumed hydrazine until its concentration decreased to about 0.3 per cent, whereat effective utilization of the hydrazine was still maintained.

EXAMPLE 8

The half cell of Example 6 was operated replacing the hydrazine by an equivalent amount of sodium boranate. Equally satisfactory results are obtained.

Likewise, other alkali metal boranates can be used, such as potassium boranate at concentrations varying in the range shown above for the hydrazine.

EXAMPLE 9

Several electrodes of carbonyl cobalt were prepared in a like procedure as shown in Example 1. The amounts of mercury were varied in the ranges shown above. An optimum at about 1.5 to 2.5 mg of Hg per $cm^2$ electrode surface was determined.

Figure 7:
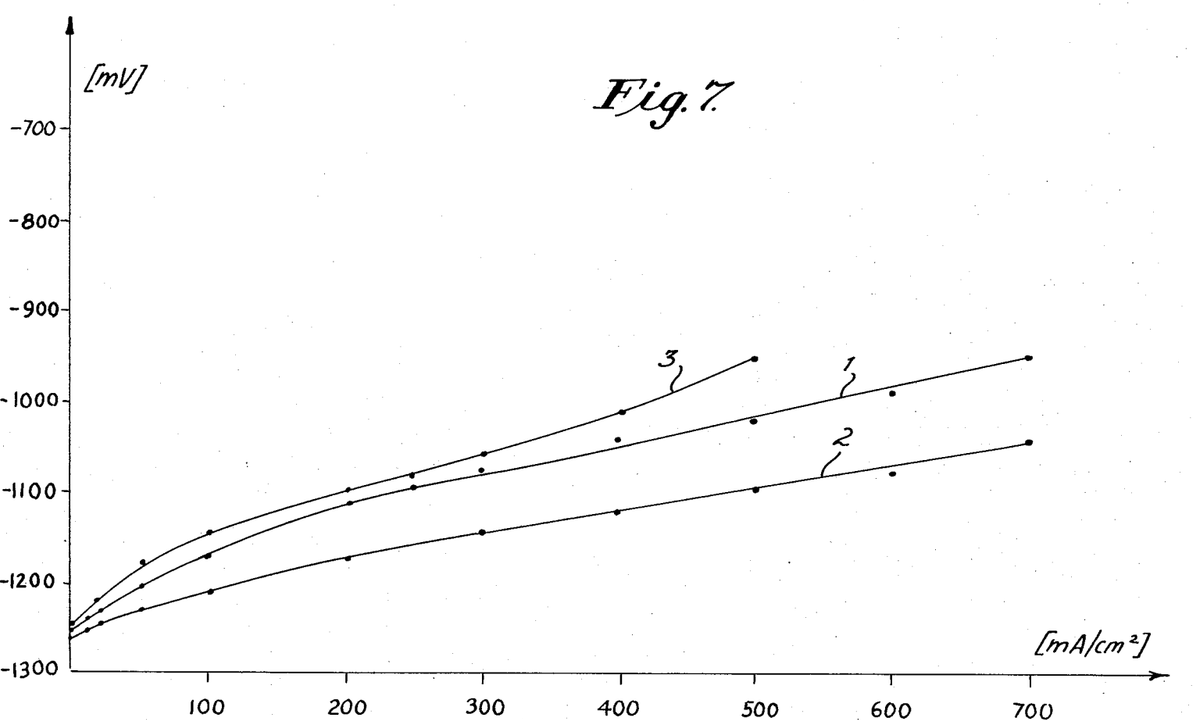
FIG. 7 shows the performance of a cobalt amalgam electrode of the invention.

FIG. 7 illustrates the performance of two such cobalt amalgam electrodes, at 60°C in an electrolyte of 6 N KOH and 2 moles of $N_2H_4$. Curves 1 and 2 represent the electrode with 25 mg of Hg for 25 $cm^2$ and 50 mg of Hg for 25 $cm^2$, respectively.

Curve 3 represents the performance with 1 mole of $N_2H_4$ for 25 mg of Hg for 25 $cm^2$. For 50 mg of Hg for 25 $cm^2$, similar satisfactory performance was obtained.

In a like manner, an electrode of amalgamated titanium was prepared and was used in similar manner.

EXAMPLE 10

Figure 8:
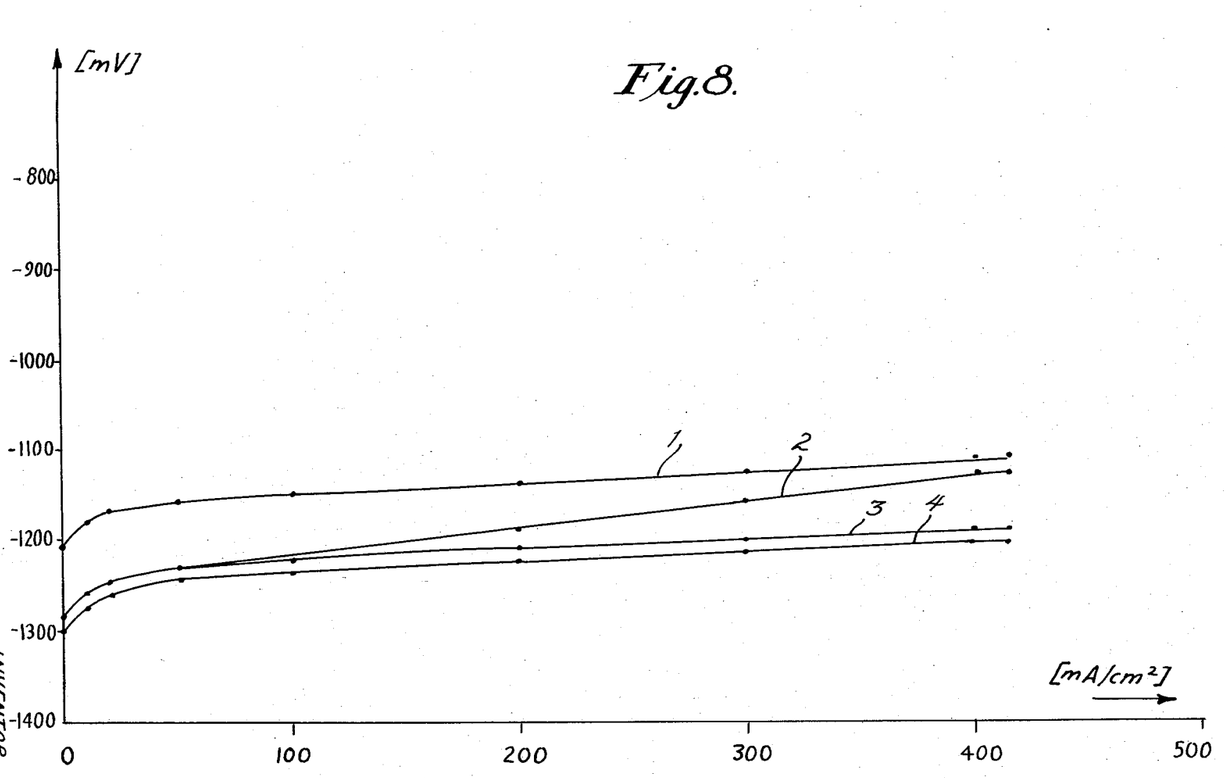
FIG. 8 shows the performance of an electrode in different concentrations of alkali.

FIG. 8 shows that a typical electrode of the invention can operate at varying electrolyte concentrations, improving significantly at high concentrations thereof.

Curves 1, 2, 3 and 4 represent concentrations of 4, 6, 10 and 12 N, KOH respectively for 2 moles of $N_2H_4$, operated at 60°C. The electrode contains 2 mg of Hg/$cm^2$ of electrode surface.

When there is a possibility that an hydrazine-containing electrolyte can reach the outer surface of the oxygen electrode, it is advisable to amalgamate at least the exposed surface area of the electrode. A partial amalgamation of a multilayered oxygen electrode (of the side or sides which are likely to be exposed to the electrolyte) is carried out by charging the electrode with hydrogen in a boranate solution (under hydrogen gas pressure) and then immersing the charged electrode into a solution that contains mercury-ions, as was described above for the fuel electrode.

When high efficiency batteries are operated, it is advisable to feed hydrazine to both cycles. From a charge beginning at approximately 150 mA/$cm^2$, an improvement of the electrical output is established in comparison with the single circuit-supply. Investigations have shown that such batteries can be operated far above 200 mA/$cm^2$ without a decline of output, unlike batteries of a single circuit supply. By installing suitable diaphragms on the oxygen side, the electrochemical conversion of such batteries can be improved still further.

The customary one layer electrodes can be used as hydrazine electrodes. Another suitable electrode is the sieve electrode. These are described in U.S. Pat No. 3,121,031, German Disclosure 1,163,412, German Patents 1,069,585 and 1,183,150. The sieve electrode is the amalgamated skeleton metal in powder form poured and held between two sieves or perforated metal sheets or asbestos sheets. Any other known electrode can be used in the invention providing it is amalgamated, as described above.

If the faces of the oxygen electrodes which face toward the hydrazine electrodes are adequately protected by amalgamation or a diaphragm, an electrode having a single catalytic face can be used. One can, however, also, as with sieve electrodes, permit the hydrazine-containing solution to flow through an intermediate or interior space between the sieve faces (and kept apart by means of a distance-holder). In this manner two catalytically active faces are contacted by the hydrazine electrolyte. Another type of electrode which can be used is the so-called gas-valve electrode, as disclosed in U.S. Pat. No. 3,201,282. The hydrazine-containing electrolyte is fed through a fine-porous cover layer to the coarsely-porous layer, made of amalgamated powder, which converts the fuel electrochemically and the nitrogen gas is conducted outside via a gas conduit.

Hydrophobic electrodes are also suited as oxygen electrodes, which are made, for example, of carbon or a plastic and are provided with the customary oxygen catalysts. If desired, for the reasons already noted, to amalgamate the electrolytic surface of such electrodes, there is admixed to the hydrophobic, supporting structure a metal powder, for example, iron or nickel powder. However, the customary metal gas diffusion electrodes can also be used in the fuel cell very satisfactorily, according to the invention. Since the metal electrodes are hydrophylic, there are used two or multi-layered electrodes, which have fine-porous cover layers on the electrolyte face.

The preferred electrodes for cells and batteries of the invention are made of amalgamated nickel since mercury adheres especially solidly to nickel and to alloys made preponderantly of nickel. When it is desired to have the hydrazine flow through and in contact with two faces of an electrode, the electrodes can be 0.3 mm thick and are mutually reinforced by plastic distance-holder knobs causing a good swirling motion of the hydrazine-containing electrolyte, or similar known means. The distance of both electrode-disks or electrode-plates from each other is approximately 1 to 5 mm depending on the length of the electrolyte flow in the electrode, whereby the disks or plates do not need to be arranged strictly parallel to each other.

As oxygen electrodes, it is preferred to use silver-containing carbon-electrodes which are provided with a fine-porous cover layer made of carbonyl-nickel.

Likewise, a very well suited type of electrodes is made of a mixture of silver-plated carbon and carbonyl-nickel-powder that is formed to an electrode body by hot-pressing or pressing and sintering. With these electrodes it is recommended to use diaphragms.

This is also desirable where the electrode of the invention is not axially flowed through by hydrazine-containing electrolytes but is contacted from both sides, as a single-layer or multi-layer electrode. In hydrazine batteries constructed of that kind, Faraday's effect of 99 percent is achieved readily be using an alkaline electrolyte with 1.5 to 6 per cent by weight hydrazine.

It is evident that a large variety of batteries can be built for the use of hydrazine in accordance with the invention. In a half-cell circuit a current density of 1.3 amp./cm$^2$ was reached at 60°C with 2 moles of hydrazine per liter of 5 N KOH. Even with 0.1 molar hydrazine solutions, charges of 100 mA/cm$^2$ could be attained at 60°C.

With the simultaneous application of hydrogen peroxide as fuel for the oxygen electrodes it is, therefore, possible to build very small batteries that have high current output under a satisfactory voltage.

Batteries built with electrodes that contained amalgamated cobalt or iron gave similar results to those of the above described nickel electrodes. Likewise alloys of these metals, like the electrodes of an amalgamated powder of Ni-Fe alloy (55:45 parts by weight), were very satisfactory.

The corresponding Raney-forms of the metals nickel, iron, and cobalt, as well as catalytically highly active powders obtained from the decomposition of other nickel materials, can also be used for the manufacture of amalgamated electrodes of the invention. However, these are not as economical and require about 10 to 50 percent by weight of a greater amount of mercury for an equivalent effect.

The electrodes of the invention can be readily reamalgamated if they have been accidentally handled or used.

Instead of hydrazine derivatives thereof can be used if their decomposition suppressed in accordance with the invention, for instance, hydrazine hydrates, or hydrazine salts like the formate or sulfate. Likewise unsymmetrical substituted hydrazines which provide a source of hydrogen are also suitable fuels which the electrodes of the invention can stabilize well and directly convert to electrical energy.

Instead of using alkaline electrolytes, conventional acid electrolytes like phosphoric or sulfuric acid (e.g. 2 to 4 N) can be used.

I claim:

1. In a fuel cell:
   a porous fuel electrode selected from the group consisting of iron, nickel, and cobalt and having a layer of mercury amalgam of said selected metal over its entire surface including the pores, and a fuel selected from the group consisting of
   hydrazine hydrazine hydrate, hydrazine salts and unsymmetrical substituted hydrazines in contact with said electrode, said amalgam being in a quantity sufficient to prevent decomposition of said fuel when no electric current is taken off,
   said cell being so constructed that the cathode does not function to decompose said fuel when no electric current is taken off.

2. A fuel cell according to claim 1, wherein said fuel electrode contains at least 0.3 to about 25 percent by weight of mercury based on the total weight of the electrode body.

3. A fuel cell according to claim 1, wherein said electrode is of iron.

4. A fuel cell according to claim 1, wherein said electrode is of nickel.

5. A fuel cell according to claim 1, wherein said electrode is of cobalt.

6. A method of producing electricity in a fuel cell comprising:
   contacting with a fuel selected from the group consisting of hydrazine hydrazine hydrate, hydrazine salts and unsymmetrical substituted hydrazines a porous fuel electrode selected from the group consisting of iron, nickel and cobalt and having a surface layer of mercury amalgam of said selected metals over its entire surface including the pores, thereby preventing the decomposition of said fuel during the rest period of the cell, said cell being so constructed that the cathode does not function to decompose said fuel when no electric current is taken off.

* * * * *